United States Patent [19]

Ogawa

[11] Patent Number: 4,794,797
[45] Date of Patent: Jan. 3, 1989

[54] METHOD OF DETECTING STRUCTURAL ABNORMALITY OF SUBSTANCE

[76] Inventor: Hiroshi Ogawa, 6-2, Iwakura-muramatsu-cho, Sakyo-ku, Kyoto-shi, Japan

[21] Appl. No.: 46,033

[22] Filed: May 4, 1987

[30] Foreign Application Priority Data

May 2, 1986 [JP] Japan ................... 61-102832

[51] Int. Cl.$^4$ ............................................. G01M 5/00
[52] U.S. Cl. ................... 73/786; 73/862.68; 73/DIG. 4; 324/456; 324/71.1
[58] Field of Search ................ 73/786, DIG. 4, 777, 73/658, 570, 862.68; 324/56, 456, 71.1; 310/311, 320, 314, 357; 374/4

[56] References Cited

U.S. PATENT DOCUMENTS

3,283,164 11/1966 Remeika ................... 310/311 X
3,948,089 4/1976 Shaw et al. ................. 73/777 X Primary Examiner—Jerry W. Myracle
Attorney, Agent, or Firm—Wenderoth, Lind & Ponack

[57] ABSTRACT

A method of detecting structural abnormalities of a structure composed of an electrically conducting crystalline or non-crystalline substance with no band gap. Piezoelectricity and/or pyroelectricity (electric energy) generated by dynamical energy such as pressure and heat applied to the structure are taken out directly from the structure and measured, thereby accurately detecting the distribution and directivity of the structural abnormality resulting from stresses in the structure.

5 Claims, 6 Drawing Sheets

METHOD OF DETECTING STRUCTURAL ABNORMALITY OF SUBSTANCE

BACKGROUND OF THE INVENTION

1. Field of the Invention

The present invention relates to a method of detecting structural abnormality of a structure composed of an electrically conductive crystalline or non-crystalline substance having no bandgap, or more specifically to a method of detecting, with higher accuracy, the distribution and directivity of structural abnormality caused by stress in a structure by transmitting piezoelectricity and/or pyroelectricity (electrical energy) directly from the structure, which piezoelectricity and/or pyroelectricity are generated in the structure due to mechanical energy such as pressure and/or heat applied thereto.

The structural abnormality referred to in the present invention includes all of those that are undesirable in a structure, such as strain, step shear (slip), cracking, etc.

2. Description of the Prior Art

One of the conventional methods of detecting structural abnormality (strain in particular) of a substance is to convert the displacement in the substance to an electrical quantity (voltage or current), the displacement being caused by piezoresistance, piezoelectricity, pyroelectricity, electrostatic capacity, magnetism and/or resistance. A strain gauge, piezoelectric pickup, slide rheostat [slide resistor (wire), slip ring], semi-conductor strain gauge, capacitor, differential transformer or Hall element is normally used as a converter for this purpose. The strain gauge is mounted directly on the substance (structure). When pressure or heat is applied to the substance placed in the electrical (or magnetic) field, stress (shear stress, tensile stress, compressive stress) is generated, causing strain of the substance. Resistance fluctuation caused by the strain is detected by the strain gauge. The piezoelectric pickup utilizes the piezoelectrical characteristic of a crystalline substance. It may be mounted directly on the subject substance or at a specified distance from the substance, and converts stress generated in the substance to a quantity of electricity.

According to the above-described conventional methods, however, the strain gauge and the piezoelectric pickup only indicate resistance fluctuation and electrical vibration, respectively, providing no accurate information as to position and degree of the mechanical structural abnormality in the substance. Namely, the observer can obtain structural change-indicating electrical signals from the strain gauge or the piezoelectric pickup mounted on the substance when the mechanical structural abnormality is large enough to be sensed by the strain gauge or the piezoelectric pickup. Since this electric signal has nothing to do with the electrical state of the subject substance, the observer cannot determine the electric polarization (piezoelectricity and pyroelectricity) caused by mechanical structural abnormality in the atomic and molecular structure of the substance. Therefore it is impossible to detect abnormalities such as atomic and molecular structural change in the substance.

Even if electrical circumstance may allow the electric field to be applied to the substance itself as a strain gauge so as to detect the mechanical structural abnormality in the substance in terms of electric resistance fluctuation, the position and degree of the structural abnormality cannot be identified accurately, that is, strain of the atomic and molecular structure in the substance cannot be detected.

As a piezoelectric pickup for the above conventional detecting method, a crystalline substance with elastic compliance such as Rochell salt, barium titanate or ammonium dihydrogenphosphate is usually selected. It is generally believed, however, that neither these non-dielectric crystalline substances (including electrical conductors having any degree of conductivity that is not dielectric and having no bandgap) nor the non-crystalline substances generate piezoelectricity and pyroelectricity. Because of this belief, picking up piezoelectricity or pyroelectricity from crystalline or non-crystalline substances that are non-dielectric electrical conductors has not been practiced in the industry to detect structural abnormality on the basis of observation of the piezoelectricity and/or pyroelectricity.

The object of the present invention is, focusing on the fact that piezoelectricity and/or pyroelectricity are generated in virtually non-dielectric crystalline or non-crystalline substances (including conductors having any degree of electrical conductivity which does not provide a dielectric property and bandgap), to provide a method of accurately detecting structural abnormality in a structure composed of the above-mentioned substance, said abnormality being caused by pressure or heat applied to the structure, and said method comprising the steps of transmitting piezoelectricity or pyroelectricity from the structure and analyzing it.

SUMMARY OF THE INVENTION

The inventor of the present invention has studied piezoelectrical and pyroelectrical phenomenon in both crystalline and non-crystalline metals.

Basically, piezoelectricity and pyroelectricity observed in metals are known to be generated in piezoelectrical crystalline substances having cubic, hexagonal, tetragonal, orthorhombic, trigonal, monoclinic or triclinic crystal structures as well as in industrial products such as piezoelectric single crystals, piezoelectric ceramics and piezoelectric base plates for surface wave elements.

The inventor has discovered that piezoelectricity and pyroelectricity are also observed in iron, copper, aluminum, stain-steel, brass, duralumin, solder, alloys, glass, tiles for building construction and urethane rubber, independent of whether they are crystalline or non-crystalline.

Although metals may provide various specific resistance, they are generally good electrical conductors with respect to their internal structure and band theory. The inventor has found that such metals exhibit accurate synchronous polarization when subjected to an external force. To verify the synchronous polarization, sound pressure in a square waveform was applied as an external force to a subject substance. As a result, an electric signal in the same square waveform was output from the substance.

The inventor has verified that this electrical phenomenon causes corrosion, stress fatigue, fatigue corrosion, stress corrosion and cracks in the metal, and accordingly, has developed a method of detecting momentary step shear (slip), cracking and fatigue due to insufficient design strength as the result of this electrical phenomenon.

Figure 61:
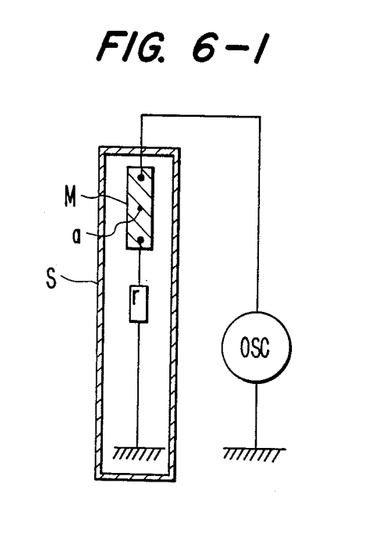
Figure 62:
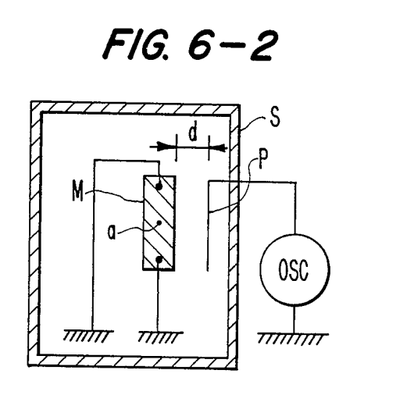

As experimental equipment for observing piezoelectricity in a substance (metal), an electric circuit with a sample plate M fixed as insulated (when sample plate M was made of glass or rubber, it was fixed as electrically grounded, that is, one end of the sample plate M was electrically grounded without intervention of a resistor and the other end was connected to an oscilloscope OSC) was housed in a stainless steel shield box S manufactured for isolating the plate M from an external electric field, as shown in FIG. 6-1. The sample plate M was struck by a rubber examination hammer for medical use or a glass block to observe piezoelectricity. As with the circuit shown in FIG. 6-2, piezoelectricity could be observed by hitting the sample.

Figure 71:
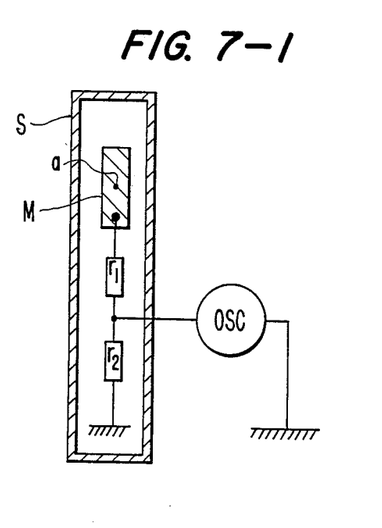

Next, using the circuit shown in FIG. 6-1, the pole "a" of the sample metal plate M was subjected instantaneously to a high temperature (thermal transmission to other area is negligible). Pyroelectricity could be observed by the oscilloscope OSC. Pyroelectricity was also observed when the temperature of heat, applied for a moment, was relatively low. Similarly, pyroelectricity was observed by using the electric circuit shown in FIG. 7-1. According to these findings, it is clear that the observed pyroelectricity is not produced by a thermocouple. By using the circuit of FIG. 7-1, not only pyroelectricity but piezoelectricity occurs and their occurrence can be verified.

Figure 72:
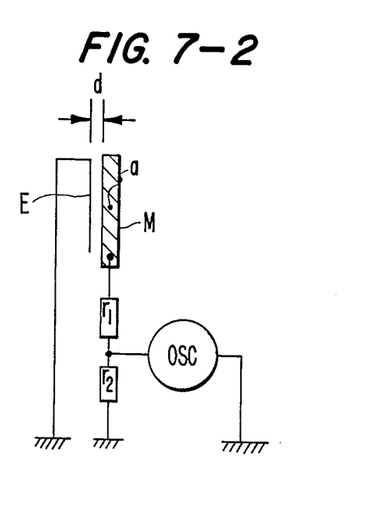

FIG. 7-2 is an explanatory drawing of the electric circuit of FIG. 6-1 and FIG. 7-1. Using the circuit of FIG. 7-2, piezoelectricity and pyroelectricity can be detected.

In FIG. 7-2 (when resistance is infinite in the circuit of FIG. 6-1, the circuit is equivalent to that shwon in FIG. 7-2), E is a ground electrode spaced apart by a distance "d" from the sample metal plate M (or facing the sample metal plate). Namely, a layer of air exists between the ground electrode E and the sample metal plate M. Piezoelectricity and pyroelectricity generated in the sample metal plate M propagate through this air layer, forming an electric circuit. In FIG. 7-2, it looks as if the ground electrode E was positioned very close to the sample metal plate M. Actually, however, since the experiment was performed within the shield box S as shown in FIG. 7-1, even the distance from the sample metal M to the closest ground pole corresponding to the ground electrode E is considerably large. The electrode P of FIG. 6-2 (which is equivalent to the ground electrode E of FIG. 7-2 in view of high potential point of the pole "a") is also spaced apart by a fairly large distance "d" from the sample metal M. Piezoelectricity and pyroelectricity ionize the air in the space between the ground electrode E and the sample metal plate M in the explanatory drawing of FIG. 7-2, causing electric propagation. As a result, a closed electric circuit is formed, leading to corrosion and fatigue in the metal.

Figure 8:
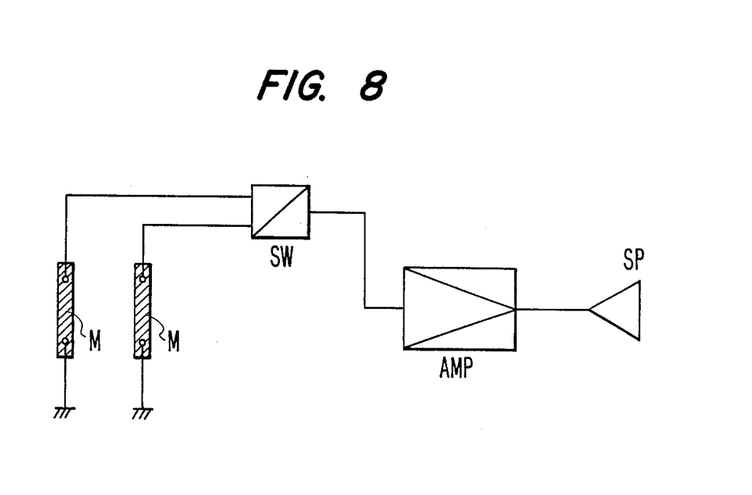
FIGS. 8 and 9 are schematic diagrams of electric circuits for examining the occurrence of piezoelectricity and pyroelectricity in a structure.

It is also possible to observe piezoelectricity and pyroelectricity generated in the sample metal M in the form of sound by using a loudspeaker SP connected to a very simple amplifier AMP as in the circuit shown in FIG. 8, or by recording them with a tape recorder TR (not shown). Momentary step shear (slip), crack and fatigue due to insufficient design strength can be determined by such observation and measurement.

Figure 9:
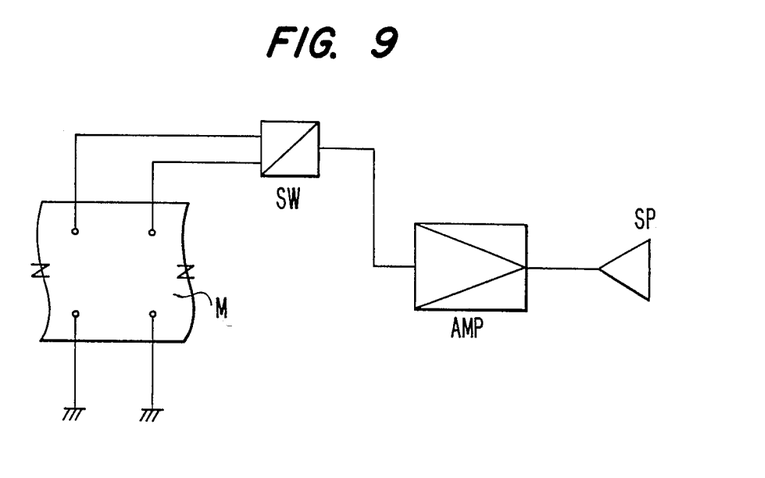

Using an electric circuit as shown in FIG. 9, the sample metal M was subjected to sound pressure, air pressure and liquid pressure as well as hammer impact, bending, tension and compression to observe piezoelectricity. Pyroelectricity generation was also observed as heat was applied. A shield box was not necessary in the experiment with the circuits shown in FIGS. 8 and 9.

The inventor has further found that piezoelectricity and pyroelectricity are generated not only in crystalline substances but also in non-crystalline substances.

When mixed with an appropriate substance, a pure crystalline metal can be changed into a substantially non-crystalline metal. Stress in the resulting non-crystalline metal leads to mechanical structural abnormality in the impurity mixture in the metal or in the molecular structure of the metal so that the metal is polarized electrically. As a result, piezoelectricity and pyroelectricity occur in the metal.

Stress of various forms resulting from the application of pressure or heat causes electrical phenomena such as piezoelectricity and pyroelectricity which give rise to adverse affects on metals such as corrosion and fatigue. Piezoelectricity and pyroelectricity are generated in a variety of substances, from those that do not exhibit mechanical properties such as toughness, elasticity or hardness to those that exhibit high degrees of toughness, elasticity or hardness, independent of whether the substance is crystalline or non-crystalline. And the observation of the vibration waveform of the substance makes it possible to recognize its components, i.e. the molecular structure of metals such as copper, aluminum and iron. Here, the attention is focused on the relationship between structures for industrial use or dynamical structures constituting industrial equipment, machine or transportation facility and the external force applied thereon and the resulting stress.

The structures for industrial use include bridges, buildings, architectural structures and engineering structures. The industrial equipment includes machinery and mechanical structures (generators, internal-combustion engines, pumps and pressure vessels for machinery in piping system). The transportation facilities include ships, aircrafts and vehicles.

Subjected to an external force, the structure for industrial use or the dynamical structure will have stress. Piezoelectricity and pyroelectricity are generated in the area where stress occurs. Namely, piezoelectric or pyroelectric phenomenon do not appear at one point in the structure. As the stress propagates, piezoelectricity or pyroelectricity corresponding to the stress is developed over the whole stress-propagating area in the structure.

Additionally, if the structure in which piezoelectricity or pyroelectricity occurs is entirely examined by using the previously mentioned electric circuit, stress distribution in the structure can be accurately detected.

Some examples of the above-described structures are illustrated schematically in FIG. 10.

Figure 10A:
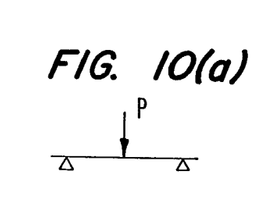

Referring to FIG. 10, FIG. 10(a) shows a simple supported beam whose center is subjected to a concentrated load "P". FIG. 10(b) shows a rigid frame structure having a beam subjected to uniform load "w". FIG. 10(c) shows a cantilever beam with a concentrated load "P" applied to the end thereof. FIG. 10(d) shows a pipe system where fluid at a high, low or ordinary temperature imparts a thermodynamical influence or pressure on the partial portion of the pipe as it flows through the pipe. FIG. 10(e) shows a screw, propeller or hydraulic turbine subjected to a face load. FIG. 10(f) shows a sliding or fitting surface such as bearing. Structures other than these structures shown in FIGS. 10(a) through (f), e.g. structures subjected to vibration and vibration source-fixing structures such as machine beds, can be tested by the present invention. The above paragraphs describe the areas of structures at which stress is dynamically or thermodynamically generated or stress is at its maximum. It is well know that of these areas, corrosion and fatigue tend to occur in the areas where stress generation is frequent.

All of the structures (a) through (f) of FIG. 10 are subjected to an external force. In these structures tension occurs sectionally at points or on surfaces subjected to the external force, and at the same time compression occurs on the other sides. Thermodynamical change takes place where pressure or heat is applied or where heat is transferred. Heat is generated along the sliding or fitting surfaces.

Figure 10B:
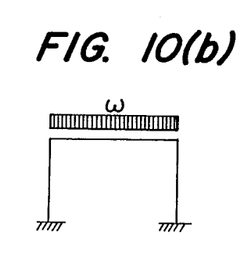
Figure 10C:
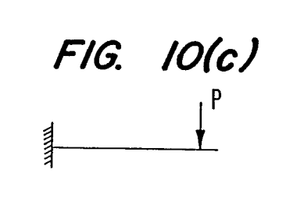
Figure 10D:
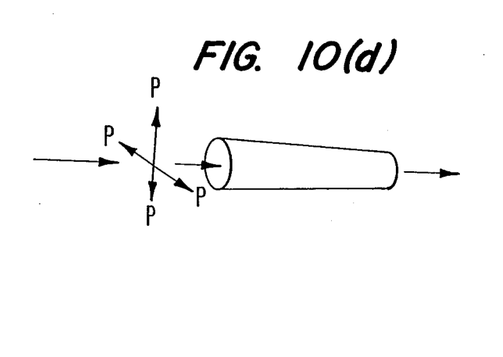
Figure 10E:
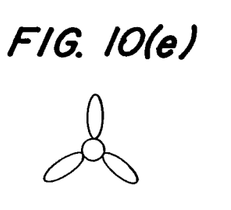
Figure 10F:
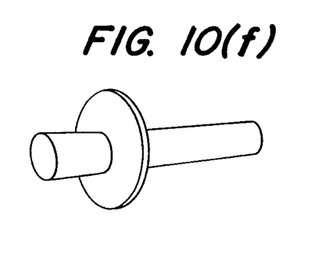

Now the occurrence of stress will be described specifically. In the structures (a), (b) and (c), stress is realized in the form of a reaction force and bending moment at the support end and then is transmitted into the support. As the force moves, compression and tension occur, causing a considerable amount of piezoelectricity or pyroelectricity to be generated locally.

In most bridges, the same stress occurs as in the structure (a) of FIG. 10. In buildings, on the other hand, piezoelectricity is generated relatively easily, freely and sequentially in response to external forces. Pyroelectricity is also generated simultaneously with or independent of the piezoelectricity depending on environment.

Generally, among the constituent parts of a building, the framework between the walls and the major beams or pillars, studs, furring strips, floor systems and the roof truss are in a condition necessary for generating piezoelectricity because they are subjected to vibration. In this case stress generated in each component includes two types: stress effected by a minor external force which may be ignored in the required mechanical calculation process, that is, by a negligibly small stationary load, and stress effected by the external force of a movable load that must be taken into consideration in the calculation. Subject to ambient temperature fluctuation, the constituent parts of the building are in a condition for generating pyroelectricity, as mentioned above.

Examples of an external force on structures for industrial use are listed below.

(1) Minor vibration propagating through the grounding (including vibration caused by traffic and geological problems)

(2) Vibration by wind pressure (wind pressure influences a structure when its own fixed load alone is considered with the movable load being ignored)

(3) Vibration caused by a movable load or shifted movable load (4) Mechanical vibration caused by machining, processing and manufacturing processes For instance, a beam is bent both under its own weight and under a load. The sum of the loads is born by a column which supports the beam. Under the tension resulting from this continuously applied load together with the external force listed above, minor vibration is generated continuously, causing piezoelectricity to occur not occasionally but continuously, or causing pyroelectricity to occur when there is a temperature fluctuation. (Pyroelectricity, piezoelectricity are caused by simultaneous, independent or synergistic (multiplied) effects of vibration and heat.)

Examples of an external force on industrial equipment and machinery are as follows.

(5) Minor pressure fluctuation during pumping (fluctuating flow rate in a pressure vessel, and fluctuation in the balance between the outer pressure and the pressure in the vessel)

(6) Air hammer shock in the pipe, and pressure, flow speed, flow rate and temperature fluctuations (7) Deflection of a pipe under its own weight, and a multiplied effected created by vibration transmitted from the exterior of the pipe and the factors in (6) above.

(8) For embedded pipings, ground pressure, loads by traffic, and temperature fluctuation of the earth (9) For propellers, cavitation caused by fluid (atmosphere and liquid)

(10) Continuous vibration and heat generated in the bearing, sliding surfaces and fitting surfaces of motors and engines, fixing beds and mounts As for the external force described in item (5), from the viewpoint of dynamics, there are numerous kinds of pressures in addition to the pumping pressure. Some pressures fluctuate significantly and others fluctuate very little as do those in the experiments conducted in conjunction with the present invention. Sound pressure is an example of the latter minorly changing pressure. Any of these pressure fluctuations can cause the electrical phenomenon.

Stress effected by one or more of the external forces (1) through (10) triggers electric phenomenon, leading to corrosion and/or fatigue in the area at which the electrical phenomenon occurs.

With this background, the inventor has studied the mechanism of piezoelectricity and pyroelectricity occurrence in substances which are subjected to every kind of external force such as pressure and heat. As a result of the study, the inventor has found that the mechanical energy effected by the external forces is changed into piezoelectricity or pyroelectricity (electrical energy). The inventor has also found that the position and degree of structural abnormalities such as strain, step shear (slip) and cracking can be accurately detected by transmitting the electrical energy directly from the substance for observation.

The detecting method of the present invention will be specifically described below.

At least one pair of terminals for transmitting piezoelectricity and pyroelectricity is connected directly to the stress distribution or concentration points on the subject structure or the subject structural system. First ends of respective wires are each connected to the terminals. The other end of each of the wires is connected through an amplifier to an analytical oscilloscope, loudspeaker or tape recorder to locate and identify the degree of abnormalities in the structure. For intensive analysis of stress in one area, a unit of an analytical device is connected to the device. A plurality of analytical devices may be connected to the device for analyzing stress in different areas.

The crystalline substances referred to in the present invention actually contain trace amounts of impurities. Among these crystalline substances are so-called pure iron, pure copper, pure aluminum, pure zinc, pure magnesium, and electrically conducting substantially pure crystalline substances of aforementioned metals that provide no band gap in the light of band theory and whose Fermi level is in the energy band. Non-crystalline substances referred to in the present invention are iron, copper and aluminum for industrial use, all the alloys based on these metals, metals and alloys (including mixtures of transition metal and nonmetallic substances, i.e. amorphous) produced by special processes (such as liquid quenching, electroplating with the application of an electrical current and electroless plating without the application of an electrical current), and all of the electrically conducting metals and alloys that provide no band gap in the light of band theory and whose Fermi level is in the energy band.

BRIEF DESCRIPTION OF THE DRAWINGS

FIGS. 5 (a) through (d) are schematic diagrams illustrating how the structural abnormality detecting method of the present invention is actually applied to structures;

FIGS. 6-1 and 6-2 are schematic diagrams showing experimental equipment used for detecting piezoelectricity and pyroelectricity which are the causes of structural abnormalities;

FIG. 7-1 is a schematic diagram showing other experimental equipment for detecting piezoelectricity and pyroelectricity that cause structural abnormalities;

FIG. 7-2 is a schematic diagram of a circuit used in the experimental equipment of FIG. 7-1;

FIGS. 10 (a) through (f) are schematic diagrams of examples of structures to which the present invention can be applied.

DETAILED DESCRIPTION OF THE PREFERRED EMBODIMENTS

Embodiments of the method of detecting structural abnormality of a substance according to the present invention are described in the following with reference to accompanying drawings.

Figure 1:
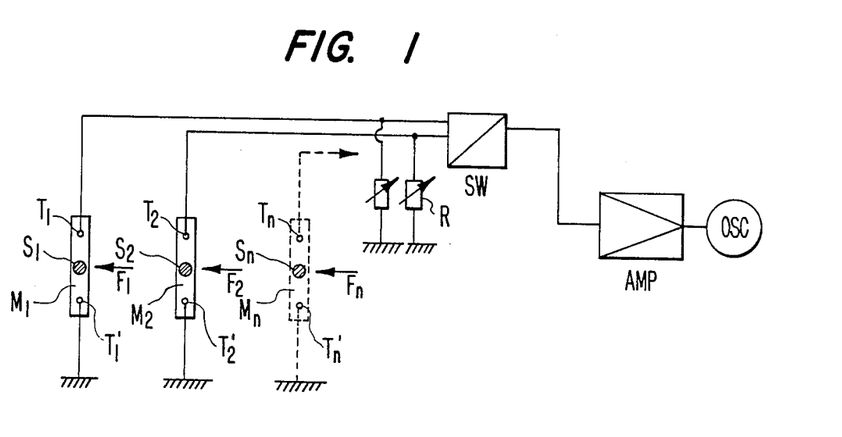
FIG. 1 is a schematical diagram of a specific detection circuit for detecting structural abnormalities in plurality of structures according to the method of the present invention.

Referring to FIG. 1 which shows the circuit for detecting structural abnormalities such as strain, step shear (slip) and cracking in substances, pairs of terminals $T_1—T_1′, T_2—T_2′, \ldots, T_n—T_n′$ are connected directly to desired positions on "n" pieces of structures $M_1, M_2, \ldots, M_n$ composed of a non-dielectric and electrically conducting crystalline or non-crystalline substance. Wire is connected to each pair of the terminals. Wire connected to one of each pair of the terminals is grounded, and wire connected to the other terminal of each pair is connected through a compensating resistor "R" to a switch "SW" and then through an amplifier "AMP" to an oscilloscope "OSC".

A vibrator is mounted to each of the structure. The vibrators provide vibrations $F_1, F_2, \ldots, F_n$ in a specified sawtooth or square waveform. The vibrations $F_1, F_2, \ldots, F_n$ and the stresses $S_1, S_2, \ldots, S_n$ resulting from the aforementioned external forces generate piezoelectricity and pyroelectricity which are amplified by the amplifier "AMP". The resulting waveform is observed through the oscilloscope "OSC". The switch "SW" may be set at "sequential" or "random" as desired when observing the waveform generated from each structure. If the waveform observed from a structure differs from that of vibration applied to the structure, it means that the structure has abnormalities such as strain, step shear (slip) and cracking. The degree of the abnormalities can be accurately determined through detailed analysis of the difference.

Specifically, if piezoelectricity and/or pyroelectricity have been generated by the external force, such should change the waveform of vibrations applied to the structure. Since the waveform of vibrations applied to the structure is known, if the waveform output to the oscilloscope "OSC" differs from the original one, it means that abnormalities are present in the structure. According to the present invention, unlike the conventional detection method in which a strain gauge is mounted directly on a structure to indicate resistance fluctuations resulting from stress fluctuations in a structure placed in an electric (or magnetic) field (or in which electrical circumstance may allow the electric (or magnetic) field to be applied directly to the structure itself as a strain gauge so as to indicate stress fluctuations in the structure in terms of electric resistance fluctuations), strain of the molecular structure, step shear (slip) and cracking are all detected accurately. Not to mention, that if the resulting waveform is identical with the original waveform of vibrations applied to the structure, there is no abnormality at least in the observed area.

Figure 2:
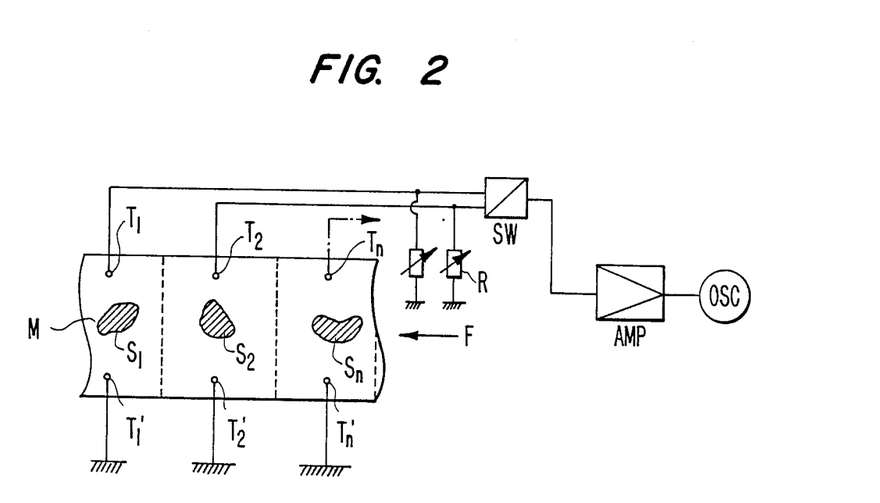
FIG. 2 is a schematical diagram of a specific circuit for detecting structural abnormalities in one structure according to the method of the present invention.

FIG. 2 shows the detection circuit for observing one structure "M". The basic principle of this circuit is the same as the one for a plurality of structures as shown in FIG. 1. In this embodiment, the structure "M" is divided into "n" pieces of blocks (by dotted lines in FIG. 2). A vibrator is mounted to the structure "M" so that the whole structure "M" is always subjected to vibration "F". Blocks with abnormalities can be located and the distribution and directivity of the abnormalities can be accurately detected by observing the resulting waveform output. In this embodiment, as the number of blocks is increased to make the area of each block smaller, the structure can be checked in more detail for abnormalities.

In the above-described embodiments, the invention is applied to structures comprising an electrically conducting crystalline or non-crystalline substance that is not dielectric and provides no band gap. Of course it can be applied, like the conventional detection method, to crystalline or non-crystalline substance which provides dielectric or band gap, and moreover in this invention the structure can be checked for abnormality more precisely than in the method using a strain gauge. In this application as well, the present invention provides for a more accurate detection to be determined than can be determined by the conventional method using a strain gauge.

In the above-described embodiments, all the vibrators provide vibrations in the same waveform. Alternatively, vibrations in a sawtooth waveform or square waveform at a different frequency or vibrations in completely different waveforms may be applied to each of the structures in FIG. 1 or to each of the structure blocks in FIG. 2 for convenience in observation and measurement.

Figure 3:
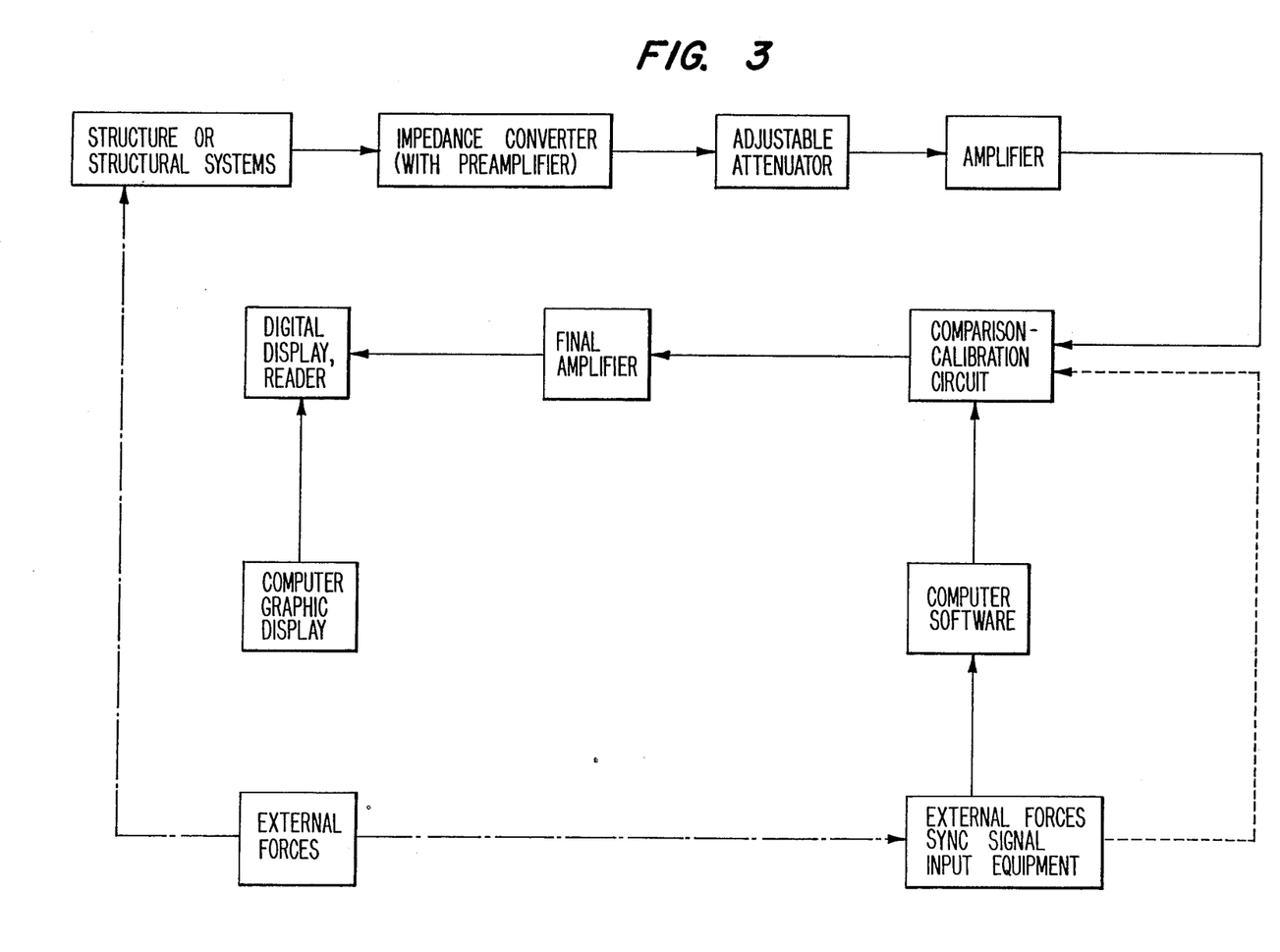
FIG. 3 is a block diagram of the abnormality detection circuit used in the present invention.
Figure 4:
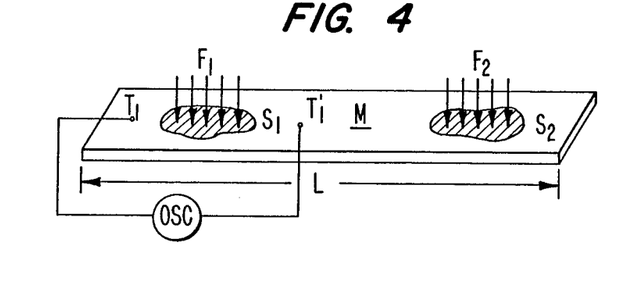
FIG. 4 is a conceptual drawing illustrating the concept of the structural abnormality detecting method of the present invention.
Figure 5A:
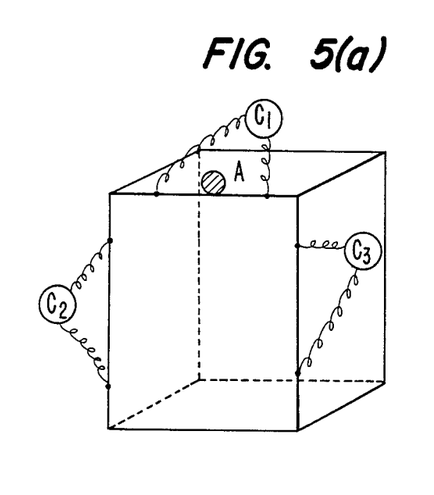
Figure 5B:
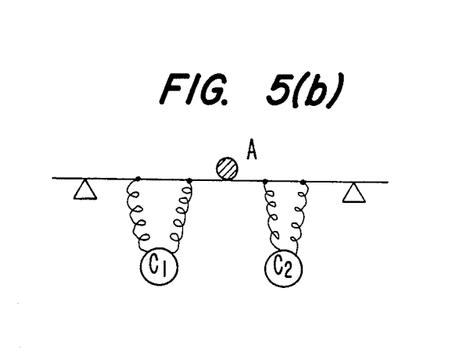
Figure 5C:
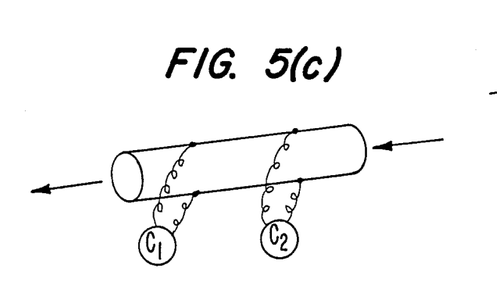
Figure 5D:
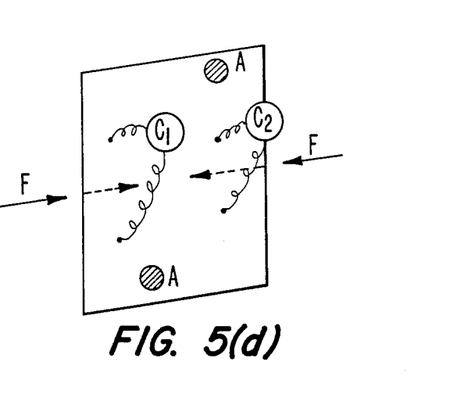

FIG. 3 is an explanatory block diagram of the structural abnormality detecting circuits of FIGS. 1 and 2. FIG. 4 shows a specific example of an abnormality detection method by using the circuit of FIG. 3. Referring to FIG. 4, external forces $F_1$ and $F_2$ are applied to a sample metal "M" having a length "L". Stresses $S_1$ and $S_2$ are generated by the external forces $F_1$ and $F_2$, respectively. The stresses $S_1$ and $S_2$ are distinguishable from each other because of the positions of the terminals $T_1$—$T_1'$. They are distinguishable if the external forces $F_1$ and $F_2$ are equal or different. Accordingly, as the number of terminals increases, stress from an external force can be distinguished more specifically. If piezoelectric elements used in the conventional measurement devices are mounted on the sample metal instead of the terminals $T_1$—$T_1'$, it is impossible or very hard to distinguish the stresses $S_1$ and $S_2$ from each other. This degree of indistinguishability is greater as the length "L" is shorter.

FIGS. 5 (a) through (d) show examples of applications of the structural abnormality detecting method of the present invention to actual structures or structural systems. FIG. 5 (a) shows a method of detecting structural abnormality in the skeletal structure of a structure or a structural system, (b) in part of a structure or a structural system (such as bridge and a rail), (c) in part of a piping system including a duct (the arrows indicate the direction of solid, liquid or gas flow), and (d) in a board or board of a structural system (such as a pressure separator, pressure vessel, etc.) which is subjected to pressure, vibration or a like external force F. In FIG. 5, $C_1$, $C_2$ and $C_3$ are circuits for transmitting generated electricity, and shaded circles "A" are movable loads or stationary wave vibrators which impart vibrations to the structures.

In the embodiments shown in the drawings, oscilloscopes OSC are used as measuring devices from which measurement data is read directly. A tape recorder may be operatively connected to the system instead of the oscilloscope OSC so that data can be reproduced later at any desired time. A loudspeaker may be operatively connected for listening to the measurement sound. The compensating resistor "R" may be omitted. The amplifier AMP and measurement device may be connected to each structure or each block of a structure to form an independent circuit for each structure or block. This enables waveforms from all the structures or blocks to be observed simultaneously. When such an independent circuit is provided for each structure or block, the switch SW is not necessary. Observation and measurement from a remote plate are possible if a telemeter is operatively connected to the system.

If the impedance converter, preamplifier, amplifier AMP, oscilloscope OSC, telemeter, etc. shown in FIG. 3 are installed in the same place and in the same grounding system with the subject structure or structural system, it is preferable to house them in strong rubber, plastic or ceramic cases for insulation.

As understood from above, according to the present invention, it is possible to accurately locate and identify the degree of structural abnormality resulting from stresses caused by various external forces in a structure composed of an electrical conductive crystalline or a non-crystalline substance with no band gap, by transmitting piezoelectricity and/or pyroelectricity generated by the stresses directly from the structure and measuring them. The detection method of this invention is applicable to structures or structural systems where piezoelectricity and/or pyroelectricity are often generated, such as large plants, buildings, civil engineering constructions, bridges, internal-combustion engines, chassis of carriages, ships, aircrafts, embedded pipes subjected to traffic loads and earth pressure, and reinforcing bars and steel frames in concrete that are exposed to dynamical and thermodynamical influences. Destruction of these structures or structural systems due to structural abnormalities can be prevented by the present invention. In addition, the present invention is applicable to nondestructive testing or destructive testing of models of the above structures or structural systems. Furthermore, the invention can be applied to strength test small structures such as small hooks, and makes it possible to recognize the components of the substance forming the subject structure or the subject structural system.

What is claimed is:

1. A method of detecting structural abnormality in a structure composed of an electrically conducting crystalline or non-crystalline substance with no band gap, said method comprising:

detecting piezoelectricity and/or pyroelectricity generated in said substance; and analyzing the piezoelectricity and/or pyroelectricity detected; and identifying the structural abnormality in the structure based on the analysis of the piezoelectricity and/or pyroelectricity detected.

2. A method as claimed in claim 1, and in which the structural abnormality in the structure is being caused by vibrations imparted to the structure in a predetermined waveform and/or predetermined temperature fluctuations in the structure, wherein said step of detecting comprises mounting at least one pair of terminals on the substances and to which terminals wires are connected for transmitting the piezoelectricity and/or pyroelectricity from the substance, said step of analyzing comprises making a comparison between the piezoelectricity and/or pyroelectricity transmitted from the substance through said wires and said predetermined waveform of vibrations and/or said predetermined temperature fluctuations, and said step of identifying includes locating and identifying the degree of structural abnormality in the structure that results from stress in the structure, due to said vibrations and/or said temperature fluctuations imparted thereto, based on said comparison.

3. A method as claimed in claim 1, and in which the structural abnormality in the structure is being caused by external forces imparted to said structure and/or temperature fluctuations, wherein said step of detecting comprises mounting at least one pair of terminals on the substance to which terminals wires are connected for transmitting the piezoelectricity and/or pyroelectricity from the substance, and converting the piezoelectricity and/or pyroelectricity into a strain wave or sound, and said step of analyzing comprises observing the strain wave or the sound, and said step of identifying includes locating and identifying the degree of said structural abnormality based on said observation.

4. A method of detecting structural abnormality in a structure caused by stress in the structure produced by an external force and/or a temperature change being imparted to the structure, the structure composed of an electrically conducting crystalline or non-crystalline substance with no band gap, said method comprising:

detecting piezoelectricity and/or pyroelectricity generated in the substance due to the external force and/or the temperature change imparted thereto; and identifying the distribution and directivity of said structural abnormality on the basis of the piezoelectricity and/or pyroelectricity detected.

5. A method of detecting structural abnormality in a substance resulting from an external force and/or a temperature change being imparted thereto, said substance consisting of an electrically conducting crystalline or non-crystalline material with no band gap, said method comprising:

detecting piezoelectricity and/or pyroelectricity generated in said substance due to the external force and/or the temperature change imparted thereto;
  analyzing the piezoelectricity and/or pyroelectricity to detect structural abnormality in the structur, and
  identifying the structural abnormality in the structure based on the analysis of the piezoelectricity and/or pyroelectricity detected.

* * * * *